United States Patent
Liao et al.

(10) Patent No.: US 8,838,272 B2
(45) Date of Patent: Sep. 16, 2014

(54) ROBOTIC ARM CONTROL SYSTEM AND METHOD

(75) Inventors: Chun-Neng Liao, New Taipei (TW); Shen-Chun Li, New Taipei (TW); Wen-Laing Tseng, New Taipei (TW); Cheng-Hsien Lee, New Taipei (TW); Shou-Kuo Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 403 days.

(21) Appl. No.: 13/334,344

(22) Filed: Dec. 22, 2011

(65) Prior Publication Data

US 2013/0073083 A1  Mar. 21, 2013

(30) Foreign Application Priority Data

Sep. 19, 2011  (TW) .............................. 100133551 A

(51) Int. Cl.
*G06F 19/00* (2011.01)
*G05B 19/04* (2006.01)

(52) U.S. Cl.
USPC ............................ 700/251; 700/259; 382/154

(58) Field of Classification Search
USPC ......... 700/254, 245, 250, 258, 251, 252, 259; 382/154, 153, 155
See application file for complete search history.

(56) References Cited

U.S. PATENT DOCUMENTS

| | | | | |
|---|---|---|---|---|
| 4,836,733 A | * | 6/1989 | Hertel et al. | 414/744.5 |
| 4,876,728 A | * | 10/1989 | Roth | 382/153 |
| 7,209,802 B2 | * | 4/2007 | Jerregard et al. | 700/245 |
| 7,257,237 B1 | * | 8/2007 | Luck et al. | 382/103 |
| 8,229,595 B2 | * | 7/2012 | Seelinger et al. | 700/254 |
| 2008/0058835 A1 | * | 3/2008 | Farritor et al. | 606/130 |
| 2010/0234993 A1 | * | 9/2010 | Seelinger et al. | 700/254 |
| 2011/0081000 A1 | * | 4/2011 | Gertner et al. | 378/65 |
| 2011/0169193 A1 | * | 7/2011 | Bonassar et al. | 264/308 |
| 2012/0326963 A1 | * | 12/2012 | Minnen | 345/156 |

* cited by examiner

*Primary Examiner* — Ronnie Mancho

(74) *Attorney, Agent, or Firm* — Novak Druce Connolly Bove + Quigg LLP

(57) ABSTRACT

A robotic arm control system is provided. In, the robotic arm control system, any three points A, B, and C of an object to be determined are picked, thereby creating an original coordinate system. A robotic arm is directed to rotate around the x-axis of the original coordinate system to reach the points B and C. During the rotation of the robotic arm, the three points A, B, and C are recorded by a visual process. A non-linear mapping relation of the original coordinate system and the operation coordinate system is calculated according to length ratios, an angular ratio, and a differential ratio of the difference of the length ratios to the angle between the line A-B and the line A-C, thereby controlling the movement of the robotic arm according to the non-linear mapping relation. The disclosure further provides a robotic arm control method.

15 Claims, 5 Drawing Sheets

ROBOTIC ARM CONTROL SYSTEM AND METHOD

BACKGROUND

1. Technical Field

The present disclosure relates to a robotic arm control system, and particularly to a robotic arm control system and a robotic arm control method used during the operation of a robotic arm.

2. Description of Related Art

A joint type robotic arm mimics a human arm through mechanisms with pivots. Generally, the robotic arm has a control system that transforms Cartesian coordinates of the pivots to polar coordinates. Such that a user of the robotic arm can operate the robotic arm according to the Cartesian coordinate system. However, since the transformations are performed through formulas composed of trigonometric functions, errors of non-linear movement will occur when moving the robotic arm.

What is needed, therefore, is a robotic arm control system capable of overcoming the limitation described.

BRIEF DESCRIPTION OF THE DRAWINGS

Many aspects of the present disclosure can be better understood with reference to the following drawing(s). The components in the drawing(s) are not necessarily drawn to scale, the emphasis instead being placed upon clearly illustrating the principles of the present disclosure. Moreover, in the drawing(s), like reference numerals designate corresponding parts throughout the several views.

DETAILED DESCRIPTION

A robotic arm generally has a terminal mechanism disposed on an end of the robotic arm such as a screwdriver or a clip to perform various types of operations. In order to allow a user of the robotic arm to operate the robotic arm according to Cartesian coordinate system, the control system of the robotic arm has to perform the transformation between a Cartesian coordinate and a polar coordinate.

Figure 1:
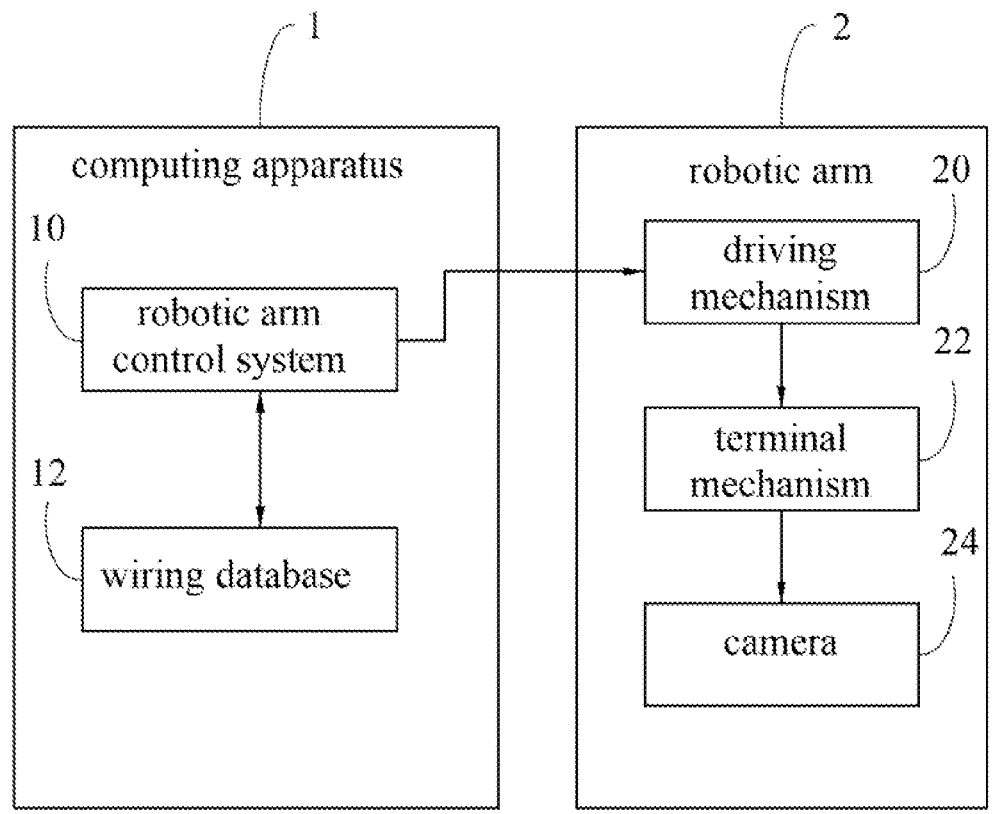
FIG. 1 is a block diagram of an embodiment of an application of a robotic arm control system of the present disclosure.

FIG. 1 is a block diagram of an embodiment of an application of a robotic arm control system of the present disclosure. As shown in FIG. 1, the robotic arm control system 10 is applied to a computing apparatus 1. The computing apparatus 1 is connected to a robotic arm 2. The robotic arm 2 includes a driving mechanism 20, a terminal mechanism 22 disposed on an end of the driving mechanism 20, and a camera 24 disposed on the terminal mechanism 22. The computing apparatus 1 controls the terminal mechanism 22 through the driving mechanism 20.

In the illustrated embodiment, an original coordinate system is created for an object to be determined such as a motherboard. The numerical coordinates of each point of the original coordinate system such as an integrated circuit (IC) pin, a through hole, or a test point is stored in a wiring database 12 of the computing apparatus 1. The robotic arm 2 has an operation coordinate system corresponding to the original coordinate system, wherein the numerical coordinates of the points of the original coordinate system and that of the points of the operation coordinate system can be transformed into each other.

Figure 2:
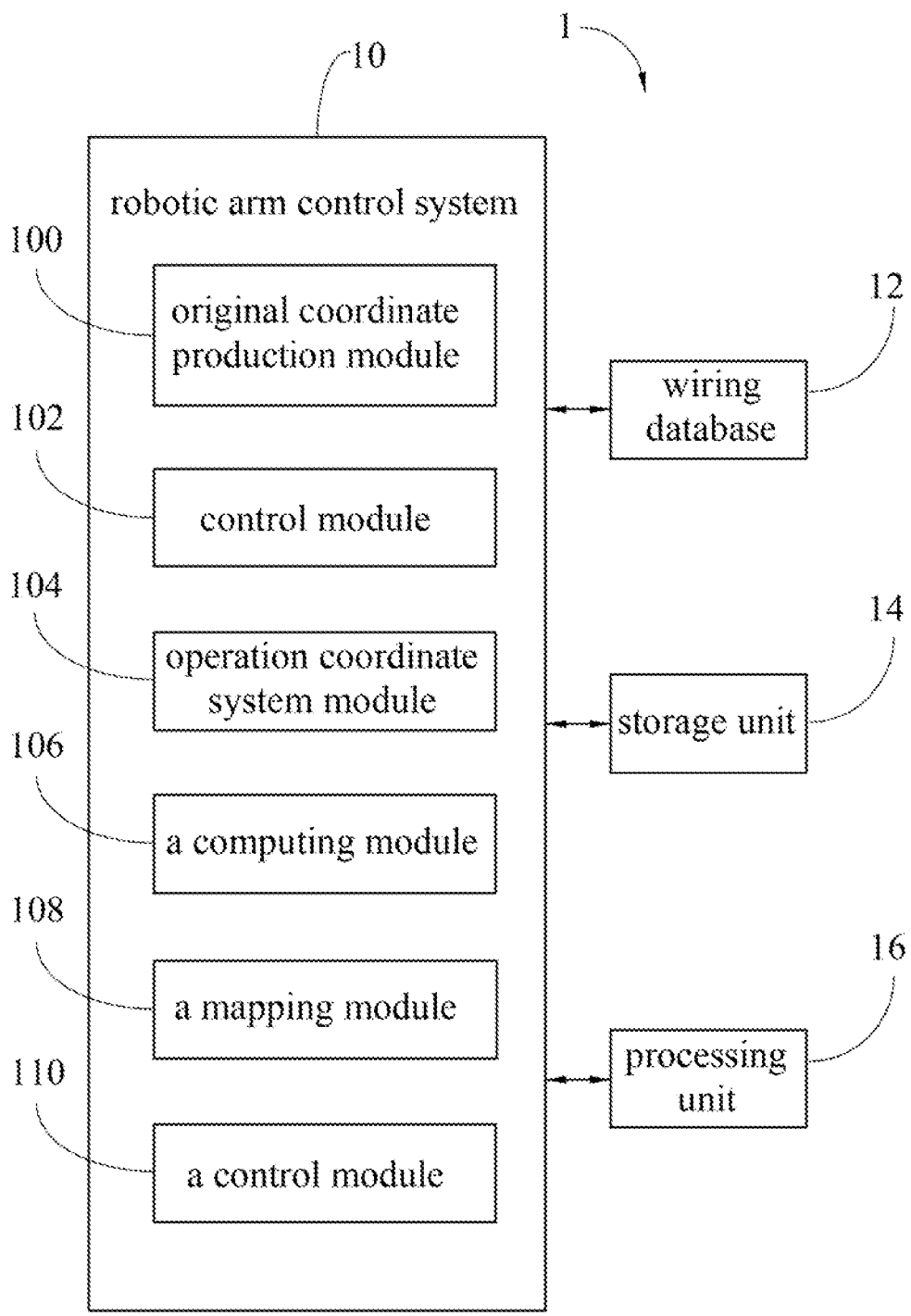
FIG. 2 is a block diagram of an embodiment of the computing apparatus of FIG. 1.

FIG. 2 is a block diagram of an embodiment of the computing apparatus of FIG. 1. As shown in FIG. 2, the computing apparatus 1 further includes a storage unit 14 and a processing unit 16. The robotic arm control system 10 is stored in the storage unit 14 in a form of software programs or instructions, and executed by the processing unit 16.

The robotic arm control system 10 includes an original coordinate production module 100, a control module 102, an operation coordinate system module 104, a computing module 106, a mapping module 108, and a control module 110.

Figure 3:
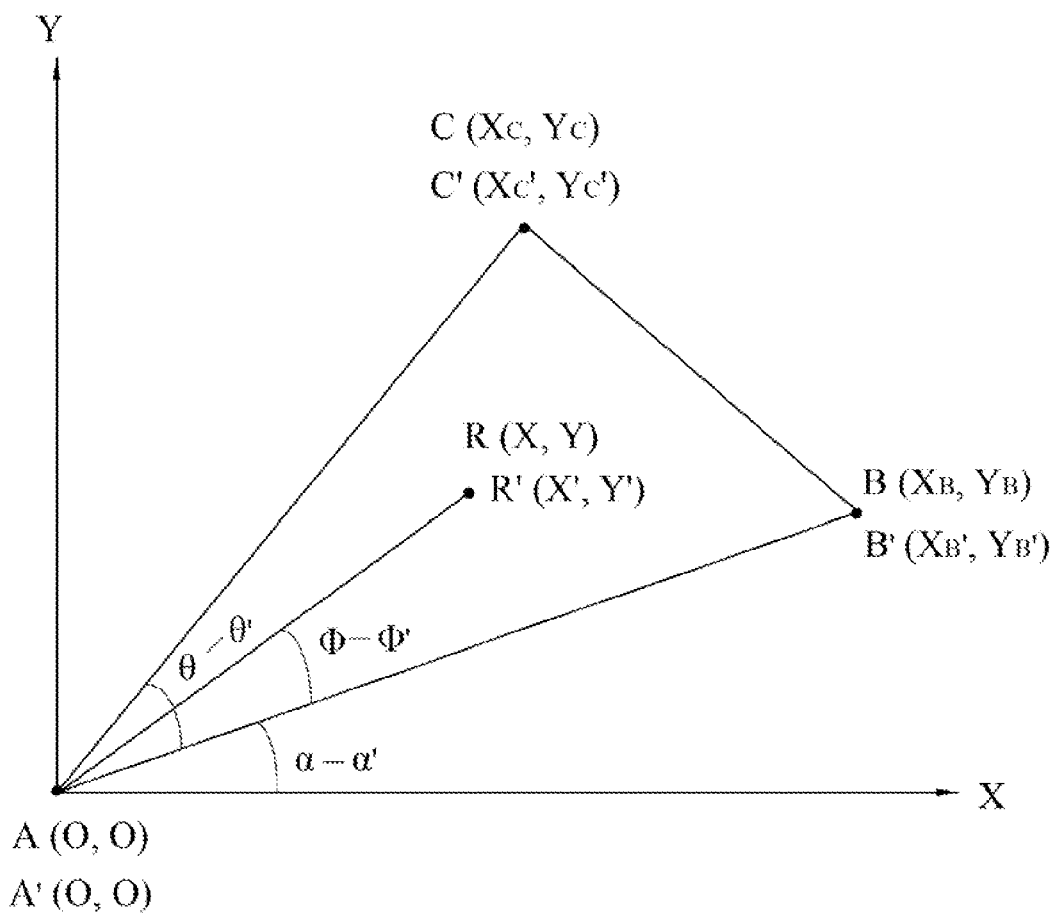
FIG. 3 is a schematic view of a mapping between an original coordinate system and an operation coordinate system of the robotic arm of FIG. 1.

The original coordinate production module 100 picks three points A, B, and C of the motherboard, thereby creating the original coordinate system with the point A as the origin. FIG. 3 is a schematic view of a mapping between an original coordinate system and an operation coordinate system of the robotic arm of FIG. 1. As shown in FIG. 3, any three points A, B, and C of the motherboard are picked, wherein point A is the origin of the original coordinate system. The numerical coordinates of the points A, B, and C and a test point R can be obtained from the wiring database 12.

The control module 102 directs the terminal mechanism 22 of the robotic arm 2 to rotate around the x-axis of the original coordinate system by a first angle $\alpha$ such that a center of the terminal mechanism 22 reaches the point B, and directs the terminal mechanism 22 to rotate around the x-axis by a second angle such that the center of the terminal mechanism reaches the point C. In the illustrated embodiment, the terminal mechanism 22 will return to the original position after the terminal mechanism 22 rotates around the x-axis of the original coordinate system by the first angle $\alpha$ or after the terminal mechanism 22 rotates around the x-axis of the original coordinate system by the second angle $\theta$, wherein the original position is the x-axis of the original coordinate system. The second angle is equal to the sum of the first angle $\alpha$ and an angle $\theta$, wherein the angle $\alpha$ is an angle between a line A-B and the x-axis, $\theta$ is an angle between the line A-B and a line A-C.

During the rotation of the terminal mechanism 22, the operation coordinate system module 104 keeps the central axis of a flange face of the robotic arm 2 to be perpendicular to the motherboard, and uses the camera 24 to record points A', B', and C' of the operation coordinate system which respectively correspond to the points A, B, and C of the original coordinate system by a visual process, wherein the point A' is the origin of the operation coordinate system.

The visual process is performed by using the camera 24 to capture an image corresponding to a point of the motherboard in the original coordinate system. For example, the point A, enlarge the image, and then transmit the enlarged image to the computing apparatus 1. The computing apparatus 1 recognizes the actual numerical coordinates of the point A in the original coordinate system according to the enlarged image, and stores the actual numerical coordinates as the point A'.

The computing module 106 calculates length ratios of a line A'-B' of the operation coordinate system to a line A-B of the original coordinate system and a line A'-C' of the operation coordinate system to a line A-C of the original coordinate system, as well as an angular ratio of the angle between the line A'-B' and the line A'-C' to the angle between the line A-B and the line A-C, and calculates a differential ratio of the difference of the length ratios to the angle between the line A-B and the line A-C The control module 102 further controls the driving mechanism 20 to drive the terminal mechanism 22 to rotate around the x-axis of the original coordinate system by a third angle such that the center of the terminal mechanism 22 reaches the test point R. In the illustrated embodiment, the terminal mechanism 22 will return to the original position after the terminal mechanism 22 rotates around the x-axis of the original coordinate system by the third angle. The camera 24 records a point R' in the operation coordinate system which corresponds to the test point R of the original coordinate system by the visual process. As shown in FIG. 3, the third angle is equal to the sum of the first angle α and an angle Φ.

The mapping module 108 calculates a non-linear mapping relation of the original coordinate system and the operation coordinate system. Particularly, the length ratios include $$\varepsilon_{AB} = \frac{|\overrightarrow{A'B'}|}{|\overrightarrow{AB}|} \text{ and } \varepsilon_{AC} = \frac{|\overrightarrow{A'C'}|}{|\overrightarrow{AC}|},$$

and the angular ratio is $$\varepsilon_\theta = \frac{\theta'}{\theta}.$$

As shown in FIG. 3, $|\overrightarrow{AB}|$ and $|\overrightarrow{AC}|$ are the length of the line A-B and the line A-C in the original coordinate system, respectively. $|\overrightarrow{A'B'}|$ and $|\overrightarrow{A'C'}|$ are the length of the line A'-B' and the line A'-C' in the operation coordinate system of the robotic arm 2, respectively. θ is the angle between the vector $|\overrightarrow{AB}|$ and the vector $|\overrightarrow{AC}|$. θ' is the angle between the vector $|\overrightarrow{A'B'}|$ and the vector $|\overrightarrow{A'C'}|$. The angles θ and θ' can be obtained by the dot product formulas:

$$\theta = \cos^{-1}\left[\frac{\overrightarrow{AB} \cdot \overrightarrow{AC}}{|\overrightarrow{AB}| \times |\overrightarrow{AC}|}\right], \theta' = \cos^{-1}\left[\frac{\overrightarrow{A'B'} \cdot \overrightarrow{A'C'}}{|\overrightarrow{A'B'}| \times |\overrightarrow{A'C'}|}\right].$$

The vector $\overrightarrow{AR}$ between the point A and the test point $$R_{(x,y)}: \begin{cases} \overrightarrow{AR} \equiv \vec{r} = (x, y) \\ |\vec{r}| = \sqrt{x^2 + y^2} \end{cases}, \begin{cases} x = |\vec{r}|\cos(\phi + \alpha) \\ y = |\vec{r}|\sin(\phi + \alpha), \end{cases}$$

wherein φ is the angle between the vector $\overrightarrow{AR}$ and the vector $\overrightarrow{AB}$, α is the angle between the vector $\overrightarrow{AB}$ and the x-axis. Hence, the angle φ between the vector $\overrightarrow{AR}$ and the vector $\overrightarrow{AB}$:

$$\phi = \cos^{-1}\left[\frac{\overrightarrow{AR} \cdot \overrightarrow{AB}}{|\overrightarrow{AR}| \times |\overrightarrow{AB}|}\right] = \cos^{-1}\left[\frac{\vec{r} \cdot \overrightarrow{AB}}{|\vec{r}| \times |\overrightarrow{AB}|}\right].$$

The angle φ' between the vector $\overrightarrow{A'R'}$ and the vector $\overrightarrow{A'B'}$: φ'=ε_θ×φ. In the original coordinate system, ε_{AB} gradually becomes to ε_{AC} within the range of the angle θ, which is a tensor in a polar coordinates system, is defined as a differential ratio of the difference of the length ratios (gyration radius of the terminal mechanism 22) to the angle between the line A-B and the line A-C:

$$\frac{d\varepsilon}{d\theta} = \frac{\varepsilon_{AC} - \varepsilon_{AB}}{\theta}.$$

In the illustrated embodiment, since the point B and the point B' are the same point, and the point A and the point A' are also the same point, the ratios will be 1.

According to the above formulas, the length relationship of the vector $\overrightarrow{AR}$ in the original coordinate system and the vector $\overrightarrow{A'R'}$ in the operation coordinate system is:

$$\frac{|\vec{r}'|}{|\vec{r}|} = \varepsilon_{AB} + \phi' \times \frac{d\varepsilon}{d\theta},$$

$$\begin{cases} |\vec{r}'| = |\vec{r}| \times \left(\varepsilon_{AB} + \phi' \times \frac{d\varepsilon}{d\theta}\right) \\ |\vec{r}'| = \sqrt{x'^2 + y'^2} = \sqrt{x^2 + y^2} \times \left(\varepsilon_{AB} + \phi' \times \frac{d\varepsilon}{d\theta}\right) \end{cases}.$$

Hence, the non-linear mapping relation between the original coordinate system and the operation coordinate system:

$$R'_{(x',y')}: \begin{cases} x' = |\vec{r}'| \times \cos(\phi' + \alpha') + x'_A \\ y' = |\vec{r}'| \times \sin(\phi' + \alpha') + y'_A \end{cases}, \text{ wherein}$$

$$\left[\cos\alpha' = \frac{(x'_B - x'_A, y'_B - y'_A) \cdot (x'_B - x'_A, 0)}{\sqrt{(x'_B - x'_A)^2 + (y'_B - y'_A)^2} \times \sqrt{(x'_B - x'_A)^2}},\right.$$

$$\left.\sin\alpha' = \sqrt{1 - \cos^2\alpha'}\right],$$

$$\left[\cos\phi' = \frac{(x'_B - x'_A, y'_B - y'_A) \cdot (x'_C - x'_A, y'_C - y'_A)}{\sqrt{(x'_B - x'_A)^2 + (y'_B - y'_A)^2} \times \sqrt{(x'_C - x'_A)^2 + (y'_C - y'_A)^2}},\right.$$

$$\left.\sin\phi' = \sqrt{1 - \cos^2\phi'}\right],$$

$$\begin{bmatrix} \cos(\phi' + \alpha') = \cos\phi' \times \cos\alpha' - \sin\phi' \times \sin\alpha' \\ \sin(\phi' + \alpha') = \sin\phi' \times \cos\alpha' - \cos\phi' \times \sin\alpha' \end{bmatrix}.$$

A relative distance between the point R' and the origin A' can be obtained through the non-linear mapping relation. The control module 110 controls the movement of the robotic arm 2 according to the relative distance between the point R' and the origin A'. As a result, the robotic arm 2 can be operated accurately.

In addition, the transformation is performed automatically. That is, after the numerical coordinates of the points A, B, and C of the original coordinate system are inputted through a software interface of the computing apparatus 1, the numerical coordinate of the point R' corresponding to the test point R is automatically calculated, thereby controlling the movement of the robotic arm 2.

Figure 4A:
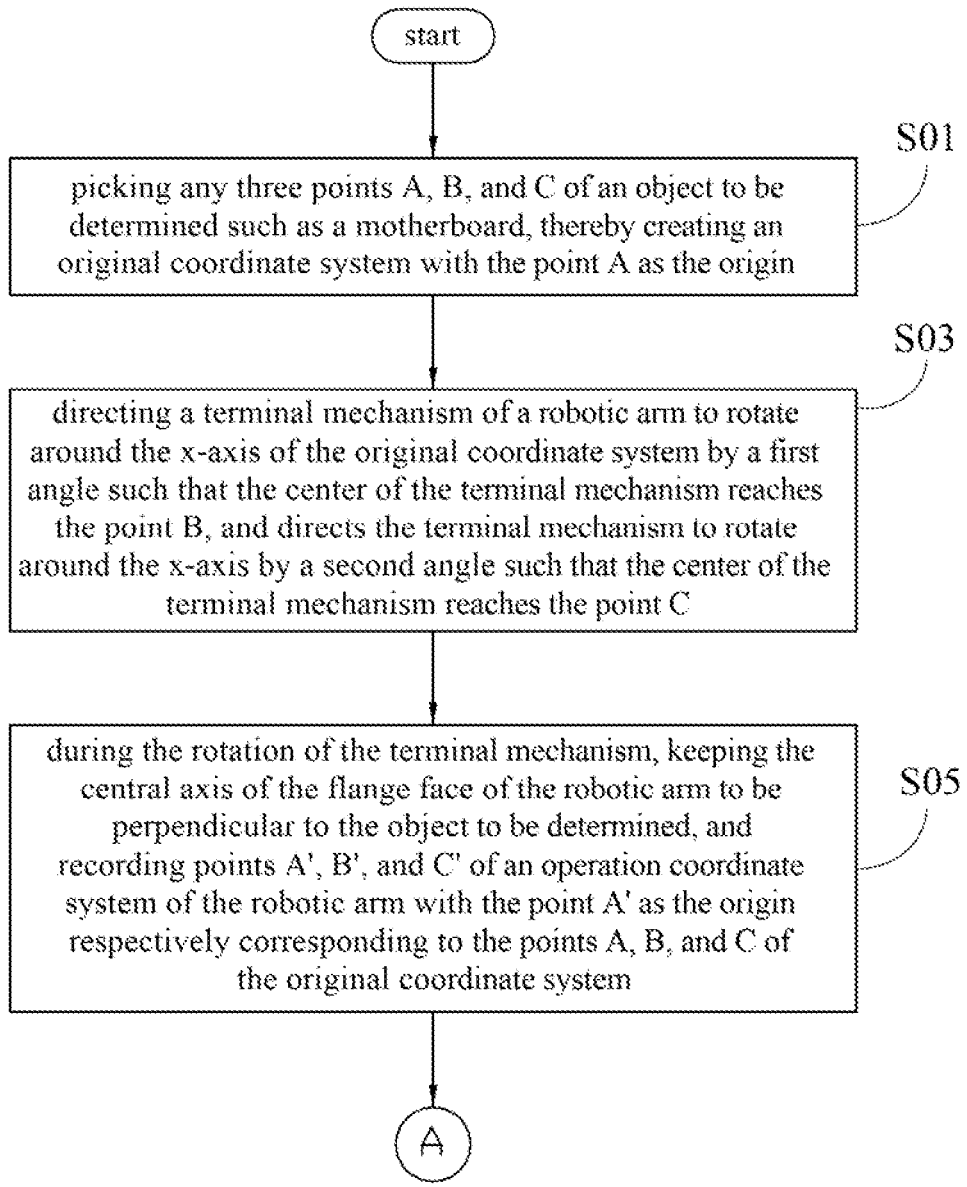
FIG. 4A/4B is a flowchart of an embodiment of a robotic arm control method of the present disclosure.
Figure 4B:
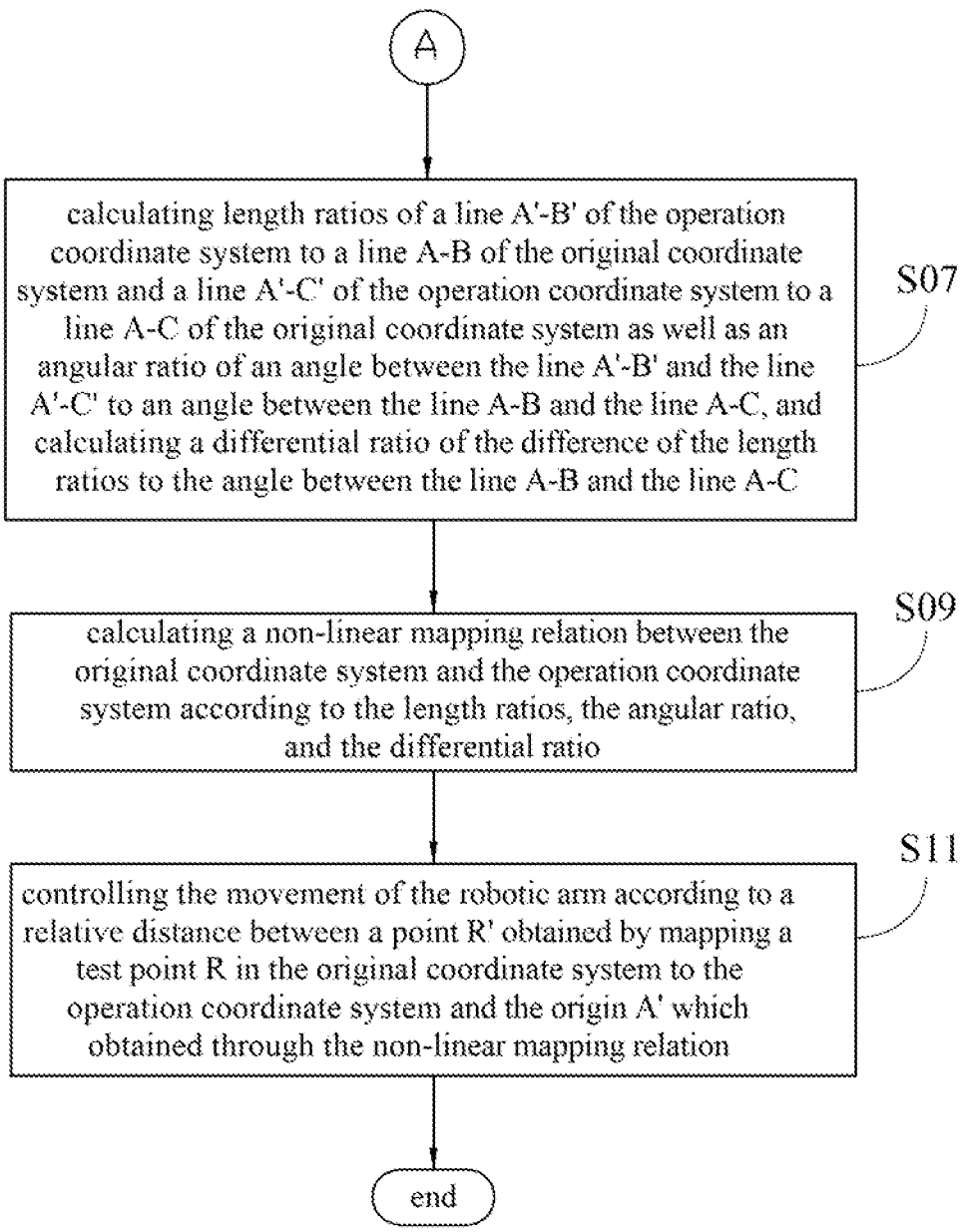

FIG. 4A/4B is a flowchart of an embodiment of a robotic arm control method of the present disclosure. As shown in FIG. 4A/4B, the emergency command method of the present disclosure is as follows. Depending on the embodiment, additional steps may be added, others removed, and the ordering of the steps may be changed.

In step S01, the original coordinate production module 100 picks any three points A, B, and C of an object to be determined such as a motherboard, thereby creating an original coordinate system which takes the point A as the origin. In the illustrated embodiment, the numerical coordinates of each point of the original coordinate system are stored in the wiring database 12.

In step S03, the control module 102 directs the terminal mechanism 22 of the robotic arm 2 to rotate around the x-axis of the original coordinate system by the first angle α such that the center of the terminal mechanism reaches the point B, and directs the terminal mechanism to rotate around the x-axis by the second angle such that the center of the terminal mechanism reaches the point C. The second angle is equal to the sum of the first angle α and the angle θ. In the illustrated embodiment, the terminal mechanism 22 will return to the original position after the control module 102 directs the terminal mechanism 22 to rotate around the x-axis of the original coordinate system by the first angle α or after the control module 102 directs the terminal mechanism 22 to rotate around the x-axis of the original coordinate system by the second angle θ. The original position can be, for example, the x-axis of the original coordinate system.

In step S05, during the rotation of the terminal mechanism 22, the operation coordinate system module 104 keeps the central axis of the flange face of the robotic arm to be perpendicular to the object to be determined, and records points A', B', and C' of the operation coordinate system respectively corresponding to the points A, B, and C of the original coordinate system by a visual process, wherein the origin of the operation coordinate system is the point A'. The visual process includes using the camera 24 to capture an image corresponding to a point of the motherboard, for example, the point A, enlarge the image, and then transmit the enlarged image to the computing apparatus 1. The computing apparatus 1 recognizes the actual numerical coordinates of the point A in the original coordinate system according to the enlarged image, and stores the actual numerical coordinates as the point A'.

In step S07, the computing module 106 calculates length ratios of a line A'-B' of the operation coordinate system to a line A-B of the original coordinate system and a line A'-C' of the operation coordinate system to a line A-C of the original coordinate system as well as an angular ratio of an angle between the line A'-B' and the line A'-C' to an angle between the line A-B and the line A-C, and calculates a differential ratio of the difference of the length ratios to the angle between the line A-B and the line A-C. The arithmetic process is as shown above.

In step S09, the mapping module 108 calculates a non-linear mapping relation between the original coordinate system and the operation coordinate system according to the length ratios, the angular ratio, and the differential ratio. Consequently, a relative distance between a point R' obtained by mapping a test point R in the original coordinate system to the operation coordinate system and the origin A' can be obtained through the non-linear mapping relation. The non-linear mapping relation transforms the coordinates of an original coordinate system of an object to be determined to an operation coordinate system of the object. The arithmetic process is as shown above.

In step S11, the control module 110 controls the movement of the robotic arm 2 according to the relative distance between the point R' and the origin A' which obtained through the non-linear mapping relation.

In addition to joint type robotic arms, the robotic arm control system and the robotic arm control method of the present disclosure can also be applied to non joint type robotic arms. The errors of non-linear movement of a robotic arm are resolved by using a non-linear mapping relation to transform the coordinates of an original coordinate system of an object to be determined to the operation coordinate system of the robotic arm.

While the disclosure has been described by way of example and in terms of preferred embodiment, it is to be understood that the disclosure is not limited thereto. To the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A robotic arm control method applied in a computing apparatus, comprising:
    picking any three points A, B, and C of an object to be determined to create an original coordinate system having x-axis, y-axis, and z-axis with the point A as the origin;
    directing a terminal mechanism of a robotic arm to rotate about the x-axis of the original coordinate system by a first angle such that a center of the terminal mechanism reaches the point B, and directing the terminal mechanism to rotate about the x-axis by a second angle such that the center of the terminal mechanism reaches the point C, wherein during the rotation of the terminal mechanism, points A', B', and C' of an operation coordinate system of the robotic arm with the point A' as the origin respectively corresponding to the points A, B, and C of the original coordinate system are recorded by a visual process, while a central axis of a flange face of the robotic arm is kept perpendicular to the object;
    calculating length ratios of a line A'-B' of the operation coordinate system to a line A-B of the original coordinate system and a line A'-C' of the operation coordinate system to a line A-C of the original coordinate system as well as an angular ratio of an angle between the line A'-B' and the line A'-C' to an angle between the line A-B and the line A-C, and calculating a differential ratio of the difference of the length ratios to the angle between the line A-B and the line A-C;
    calculating a non-linear mapping relation of the original coordinate system and the operation coordinate system according to the length ratio, the angular ratio, and the differential ratio; and
    controlling the movement of the robotic arm according to the non-linear mapping relation.

2. The robotic arm control method of claim 1, wherein the visual process includes the following steps:
    using a camera disposed on the terminal mechanism of the robotic arm to capture an image corresponding to the point of the object in the original coordinate system;
    enlarging the image;
    transmitting the enlarged image to the computing apparatus; and using the computing apparatus to determine and record the actual numerical coordinate of the point in the original coordinate system according to the enlarged image.

3. The robotic arm control method of claim 1, wherein in the step of directing the terminal mechanism of the robotic arm to rotate about the x-axis, the terminal mechanism returns to the original position after the terminal mechanism rotates about the x-axis of the original coordinate system by the first angle, and the terminal mechanism returns to the original position after the terminal mechanism rotates about the x-axis of the original coordinate system by the second angle.

4. The robotic arm control method of claim 1, further comprising:
directing the terminal mechanism to rotate about the x-axis of the original coordinate system by a third angle such that the center of the terminal mechanism reaches a test point R of the original coordinate system.

5. The robotic arm control method of claim 4, wherein the terminal mechanism returns to the original position after the terminal mechanism rotates about the x-axis of the original coordinate system by the third angle.

6. The robotic arm control method of claim 4, wherein the step of controlling the movement of the robotic arm includes controlling the movement of the robotic arm according to a relative distance between a point R' in the operation coordinate system corresponding to the test point R of the original coordinate system and the origin of the operation coordinate system obtained through the non-linear mapping relation.

7. The robotic arm control method of claim 1, wherein the numerical coordinates of the points of the original coordinate system are stored in a database connected to the computing apparatus.

8. A robotic arm control system applied in a computing apparatus, comprising:
an original coordinate production module picking any three points A, B, and C of an object to be determined, and creating an original coordinate system with the point A as the origin;
a control module directing a terminal mechanism of a robotic arm to rotate about the x-axis of the original coordinate system by a first angle such that a center of the terminal mechanism reaches the point B, and directing the terminal mechanism to rotate about the x-axis by a second angle such that the center of the terminal mechanism reaches the point C;
an operation coordinate system module, wherein during the rotation of the terminal mechanism, the operation coordinate system module keeps a central axis of the flange face of the robotic arm to be perpendicular to the object, and records the three points A, B, and C respectively as points A', B', and C' of an operation coordinate system of the robotic arm with the point A' as the origin by a visual process;
a computing module calculating length ratios of a line A'-B' of the operation coordinate system to a line A-B of the original coordinate system and a line A'-C' of the operation coordinate system to a line A-C of the original coordinate system as well as an angular ratio of an angle between the line A'-B' and the line A'-C' to an angle between the line A-B and the line A-C, and calculating a differential ratio of the difference of the length ratios to the angle between the line A-B and the line A-C;
a mapping module calculating a non-linear mapping relation of the original coordinate system and the operation coordinate system according to the length ratio, the angular ratio, and the differential ratio; and
a control module controlling the movement of the robotic arm according to the non-linear mapping relation.

9. The robotic arm control system of claim 8, further comprising a camera disposed on the terminal mechanism of the robotic arm, wherein in the visual process, the camera captures an image corresponding to the point of the object in the original coordinate system, the image is transmitted to the computing apparatus after being enlarged by the camera, and the computing apparatus determines and records the actual numerical coordinate of the point in the original coordinate system according to the enlarged image.

10. The robotic arm control system of claim 8, wherein the control module directs the terminal mechanism to return to the original position after the terminal mechanism rotates about the x-axis of the original coordinate system by the first angle, and directs the terminal mechanism to return to the original position after the terminal mechanism rotates about the x-axis of the original coordinate system by the second angle.

11. The robotic arm control system of claim 8, wherein the control module further directs the terminal mechanism to rotate about the x-axis of the original coordinate system by a third angle such that the center of the terminal mechanism reaches a test point R of the original coordinate system.

12. The robotic arm control system of claim 10, wherein the terminal mechanism returns to the original position after the terminal mechanism rotates about the x-axis of the original coordinate system by the third angle.

13. The robotic arm control system of claim 10, wherein the control module controls the movement of the robotic arm according to a relative distance between a point R' in the operation coordinate system corresponding to the test point R of the original coordinate system and the origin of the operation coordinate system obtained through the non-linear mapping relation.

14. The robotic arm control system of claim 8, further comprising a database connected to the computing apparatus, wherein the numerical coordinates of the points of the original coordinate system are stored in the database.

15. The robotic arm control system of claim 8, further comprising a driving mechanism driving the terminal mechanism.

* * * * *